United States Patent
Bates et al.

(10) Patent No.: US 6,493,834 B1
(45) Date of Patent: Dec. 10, 2002

(54) APPARATUS AND METHOD FOR DYNAMICALLY DEFINING EXCEPTION HANDLERS IN A DEBUGGER

(75) Inventors: Cary Lee Bates, Rochester, MN (US); Jeffrey Michael Ryan, Byron, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,872

(22) Filed: Aug. 24, 1999

(51) Int. Cl.[7] ................................................. G06F 11/30
(52) U.S. Cl. ............................ 714/38; 714/35; 717/129
(58) Field of Search .............................. 714/38, 34, 35, 714/46; 717/124, 125, 127, 129–131; 712/244, 227; 710/266

(56) References Cited

U.S. PATENT DOCUMENTS

| | | | | |
|---|---|---|---|---|
| 5,537,559 A | * | 7/1996 | Kane et al. ................. | 712/244 |
| 5,790,846 A | * | 8/1998 | Mealey et al. ............... | 710/260 |
| 6,047,390 A | * | 4/2000 | Butt et al. ................... | 709/105 |
| 6,077,312 A | * | 6/2000 | Bates et al. .................. | 717/129 |
| 6,282,701 B1 | * | 8/2001 | Wygodny et al. ........... | 702/183 |

* cited by examiner

*Primary Examiner*—Scott Baderman
(74) *Attorney, Agent, or Firm*—Martin & Associates, LLC; Derek P. Martin

(57) ABSTRACT

An apparatus and method allow dynamically defining exception handlers in a debugger and breaking only when one of the dynamically-defined exception handlers is called. In this manner a programmer can define special exception handlers referred to herein as debugger exception handlers that correspond to exceptions of interest while debugging, and can thus distinguish between exceptions that are expected (and therefore handled) in a computer program and exceptions that signal a bug in the computer program during debugging.

20 Claims, 10 Drawing Sheets

```
         class Employee {                      —410
              public int doWork(int t){        —420
                  int x, y, z;                 —422
              ⎧  x=t*(t-1)/(t-2);              —430
Region #1  ⎨     y=spendEnergy(x);             —432
              ⎩  z=calculateCost(y);           —434
                 return z;                     —436
              } public int spendEnergy(int a) {  —440
                  int result;                  —442 result=potentialEnergy(a);   —450
Region #2  ⎨     result+=kineticEnergy(a);     —452
                  return result;               —454
              }
                   ⋮
         }
```

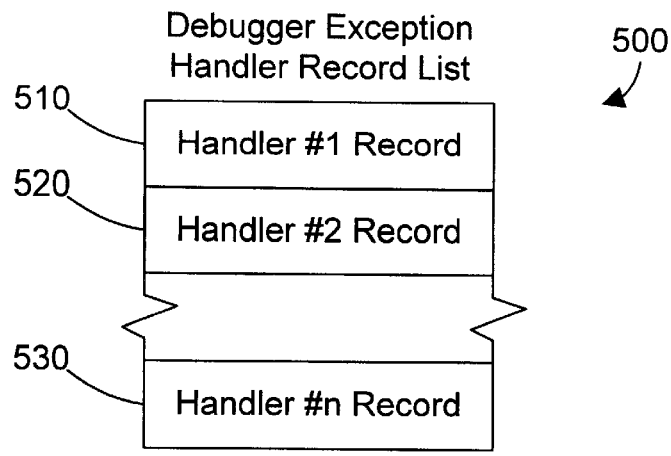

FIG. 5

| Handler #1 Record | |
|---|---|
| Exception Type | Instruction Range |
| Class Name | Employee |
| Method Name | doWork() |
| Start Instruction | 1 |
| Stop Instruction | 3 |
| Breakpoint Trigger Info | Include: *ALL; Exclude: IO Exception, SocketException |

FIG. 6

| Define Debugger Exception Handler | |
|---|---|
| Exception Type | Instruction Range ▼ / Class Default / Global Default |
| Class Name | Employee |
| Method Name | doWork |
| Start Instruction | 1 |
| Stop Instruction | 3 |
| Exceptions to Break On | *ALL |
| Exceptions to Ignore | IO Exception, SocketException |
| OK — 780 | Cancel — 790 |

FIG. 7

APPARATUS AND METHOD FOR DYNAMICALLY DEFINING EXCEPTION HANDLERS IN A DEBUGGER

BACKGROUND OF THE INVENTION

1. Technical Field

This invention generally relates to computer programming and more specifically relates to mechanisms and methods for debugging a computer program.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program. Many debuggers allow detecting when an exception is generated in the computer program.

An exception is typically generated when the computer program requires special processing. Some exceptions occur as part of the normal operation of a computer program. For example, if a communication error is detected, an exception could be generated to automatically request a re-send of the data without the user ever knowing that an error or exception occurred. This type of error could be termed an expected error, because the program has code for processing this error. However, other exceptions may occur that the program does not anticipate, that may indicate a bug in the program. Thus, it is important to distinguish between exceptions that are part of normal program processing (i.e., that are caused by an anticipated error condition), and exceptions that signal unexpected error conditions.

Some computer programming languages, like Java developed by Sun Microsystems, provide explicit try-catch instructions. In debugging a computer program, when a programmer suspects an unexpected error may occur in processing a particular block of code, the programmer can insert a "try" instruction at the beginning of the block and a "catch" instruction at the end which will catch any exceptions that might occur during the execution of the block of code. Note, however, that the block of code may include calls to other methods or procedures which in turn could make calls to other methods or procedures, and this can continue for an arbitrary depth. Exceptions may be generated at various levels within the suspicious block of code. Some of these exceptions may be expected exceptions that are handled at various levels below the block of code with the try-catch instructions. In defining a try-catch block of code in a debug mode, the programmer may not be interested in all exceptions that are generated, but only those that actually flow all the way up to the block of code where the try-catch logic resides (i.e., those that are not "handled" at lower levels).

Known debuggers allow the programmer to set one or more breakpoints in the computer program, which are points where the execution of the computer program is stopped so that the state of the program can be examined to verify that the program executed as designed. Breakpoints can also be generated when an exception occurs. However, as explained above, many exceptions in a computer program are expected exceptions, and do not signal a bug in the computer program. If a programmer specifies that a debugger break on exceptions, the debugger will generate a breakpoint for each exception, expected or not. If there is a great deal of normal exception processing, this results in the programming halting numerous times, even though no error has occurred. Without a mechanism and method for distinguishing between exceptions that are expected and those that are not, the computer industry will continue to suffer from inefficient methods and tools for debugging computer programs.

DISCLOSURE OF INVENTION

According to the preferred embodiments of the present invention, an apparatus and method allow dynamically defining exception handlers in a debugger and breaking only when one of the dynamically-defined exception handlers is activated. In this manner a programmer can define special exception handlers referred to herein as debugger exception handlers that correspond to exceptions of interest while debugging, and can thus distinguish between exceptions that are expected (and therefore handled) in a computer program and exceptions that signal a bug in the computer program during debugging.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a block diagram of a debugger exception handler record list that lists exception handlers that have been dynamically defined within a debugger;

FIG. 6 is a block diagram showing the content of one of the records in the exception handler record list of FIG. 5;

FIG. 7 is a dialog in a graphical user interface for entering information into the record of FIG. 6;

BEST MODE FOR CARRYING OUT THE INVENTION

Figure 1:
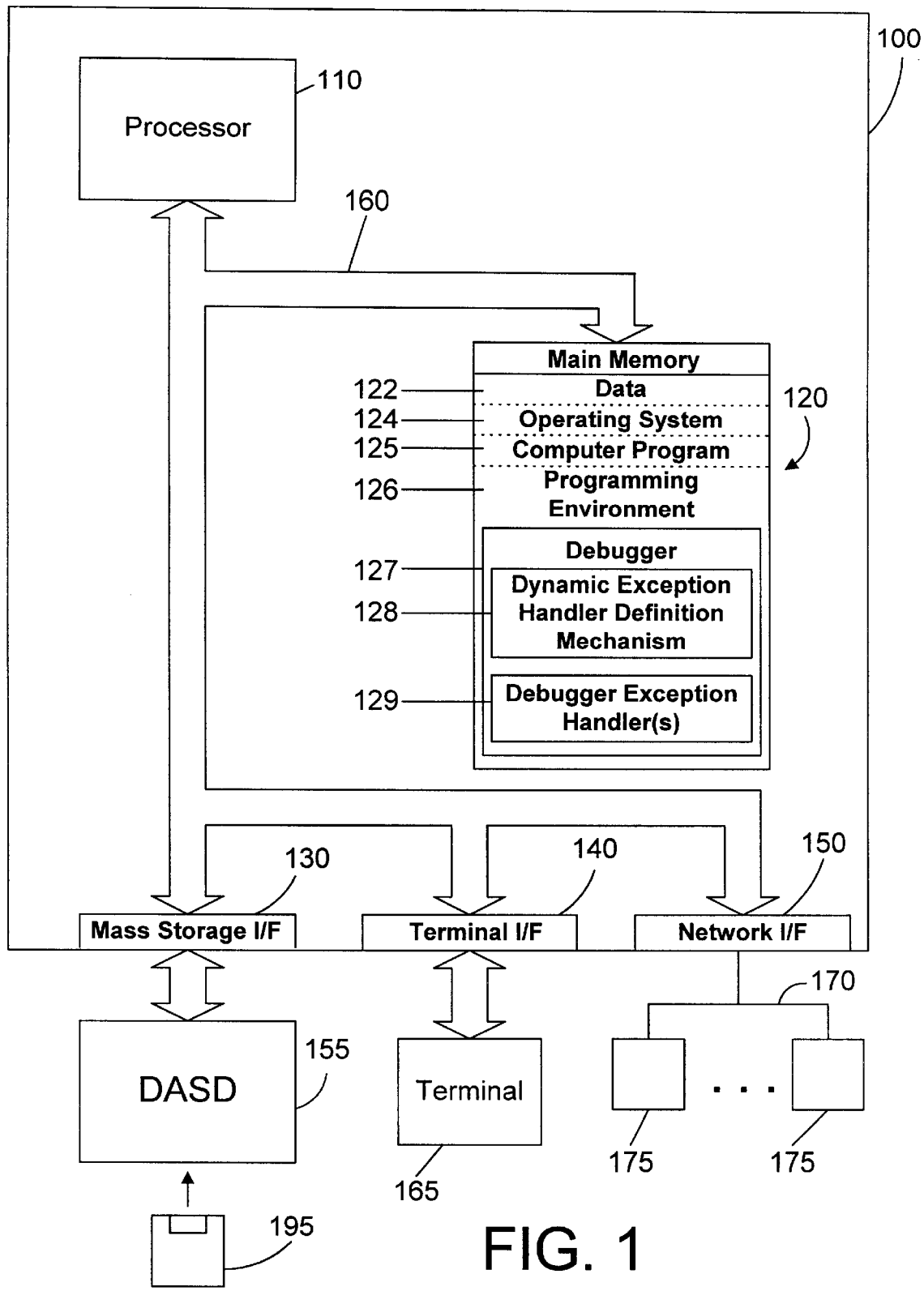
FIG. 1 is a block diagram of an apparatus in accordance with the preferred embodiments of the present invention.

The present invention is used in a programming environment for developing computer programs. For those who are not familiar with software development techniques, the brief overview below provides background information that will help the reader to understand the present invention.

1. OVERVIEW

Modern Programming Environments

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler" generically refers to any mechanism that transforms one representation of a computer program into another representation of that program.

This machine readable form, within this specification, is a stream of binary instructions (i.e., ones and zeros) that make up operational codes (known as op codes) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Once the machine-readable instructions have been generated, the computer program may be run on the computer system it was designed for.

Computer programs typically include one or more program variables that contain data of interest. These variables are typically represented by text labels in high-level and intermediate code computer programs. The concept of program variables is well known in the art.

Modern programming environments may provide many different combinations of features. For example, most programming environments include an editor or browser that displays source code to the programmer on a display device. A compiler is used, as explained above, to generate machine code from source code. A linker may also be included to allow sub-portions of the program to be separately compiled and linked together after compilation. Some programming environments include target hardware, which is the hardware on which the computer program is intended to run. Others may provide a simulator in software to "ran" the ode to simulate how the target hardware would respond to the computer program. Most modern programming environments also provide a debugger to help a programmer to locate problems in a computer program.

Debugging a Computer Program

For a computer program of any complexity, the program will likely not perform exactly as intended due to programmer errors, known as "bugs", in the computer program. To help a programmer locate the bugs in his or her program, most modern programming environments provide a debugger that gives the programmer a variety of different tools for locating bugs. For example, a typical debugger includes a breakpoint capability that stops the execution of the program when a specified event occurs. Once the program execution is stopped, the debugger typically allows the programmer to examine memory and status information to determine whether or not the program is in the proper state. A debugger may also allow a programmer to specify conditions and run a "program trace", which writes to memory a list of all events of interest to the programmer without stopping the execution of the code. The present invention applies to any mechanism or system for debugging a computer program, whether presently known or developed in the future.

Prior Art Debuggers

Current debuggers allow break points to occur during creation and throwing of an exception. If a programmer defines a try-catch block in the computer program and instructs the debugger to create a break point on exceptions, the execution of the computer program will be halted each time an exception occurs. However, as explained in the Background section, many exceptions may be generated and handled under normal program operation, and these exceptions do not indicate a bug in the computer program. When a programmer is debugging a computer program by stepping through a sequence of instructions, the programmer is generally only interested in those unhandled exceptions that flow up to the current instruction being executed.

Current debuggers also allow breakpoints to occur once the exception has flowed all the way to the top of the stack. However, in languages such as Java where the stack is unwound as the exception propagates up, this technique has some serious limitations because the debugger no longer has access to any stack frame related data. The programmer would like to be able to break and examine variables in the current stack frame where the exception flows through the try-catch block, but known debuggers only provide this capability by breaking on each exception. Because expected exceptions do not indicate an unhandled error, breaking on each expected exception is very time-consuming and frustrating for the programmer.

2. DETAILED DESCRIPTION

According to the present invention, an apparatus and method provide a way for a programmer to define special exceptions and their corresponding handlers (referred to herein as debugger exception handlers) when debugging a computer program. The debugger may halt when a debugging exception is encountered without halting on normal exceptions that are handled at a lower level in the computer program. In this manner, a programmer can define different debugger exception handlers that will help to locate bugs in a computer program.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150.

These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a computer program 125, and a programming environment 126 that includes a debugger 127. Debugger 127 includes a dynamic exception handler definition mechanism 128 for dynamically defining exceptions for debug purposes, which in turn defines one or more debugger exception handlers 129. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, computer program 125, and programming environment 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 125 represents a computer program in any form, whether source code, intermediate language, machine code, or other forms. Computer program 125 may include system programs (e.g., an operating system), application programs, or any other types and forms of computer programs.

Programming environment 126 is an environment for programmers (also called "users" herein) to develop and debug their computer programs. Debugger 127 is a debugger that includes a mechanism 128 for dynamically defining one or more debugger exception handlers 129. A programmer uses mechanism 128 to define a debugger exception in the computer program 125, preferably using a graphical user interface. Mechanism 128 then creates a debugger exception handler 129 that corresponds to the user-defined exception. Once these debugger exception handlers are in place, an exception for these handlers will cause a breakpoint so the programmer can view the state of the program at the point where the exception occurred. Other exceptions that are handled in the computer program 125 at a lower level do not cause a breakpoint.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
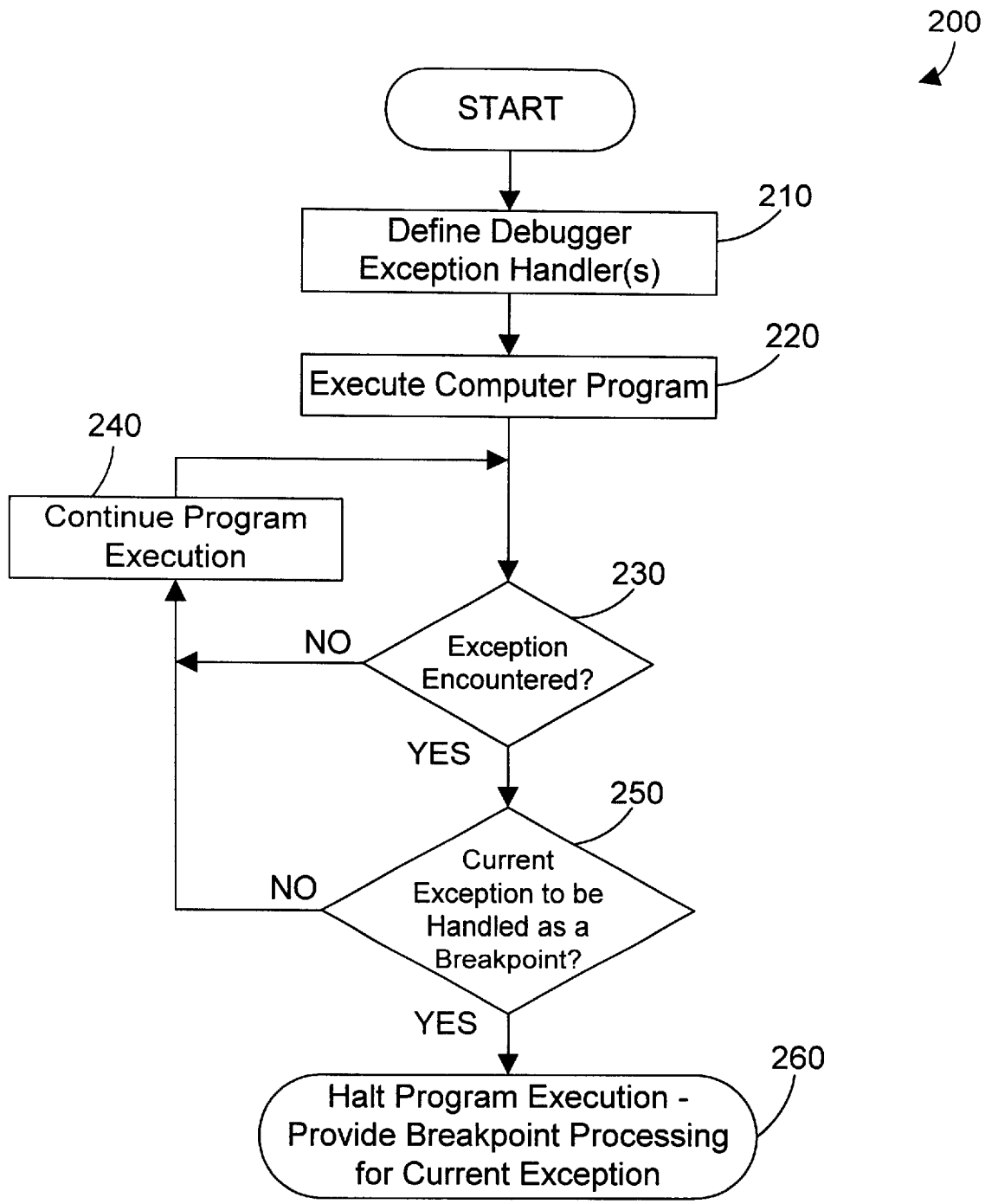
FIG. 2 is a flow diagram of a method for dynamically defining debugger exception handlers in accordance with the preferred embodiments.

The dynamic exception handler definition mechanism 128 in accordance with the preferred embodiments preferably performs a method 200 as shown in FIG. 2. Method 200 begins by dynamically defining one or more debugger exception handlers 129 for the computer program (step 210). The computer program is then executed (step 220). Note that the execution in step 220 can be an actual execution of the computer program on a processor, or can also be a simulation of the program's execution by an appropriate software tool, such as a debug interpreter. So long as no exceptions occur (step 230=NO), the program execution continues (step 240). When an exception occurs (step 230=YES), method 200 then determines whether the exception should be handled as a breakpoint (step 250). The term "current exception" in the specification and figures means the exception that just occurred. In the preferred embodiment, step 250 checks to see if the current exception is handled by one of the exception handlers that was dynamically defined in step 210. If so, other parameters may be checked to see if the current exception should be handled as a breakpoint. If the current exception is handled as a breakpoint (step 250=YES), the exception is passed as a breakpoint to the breakpoint manager. The breakpoint manager causes the execution of the computer program to be halted (step 260) to provide breakpoint processing for the current exception.

Figures 3, 4:
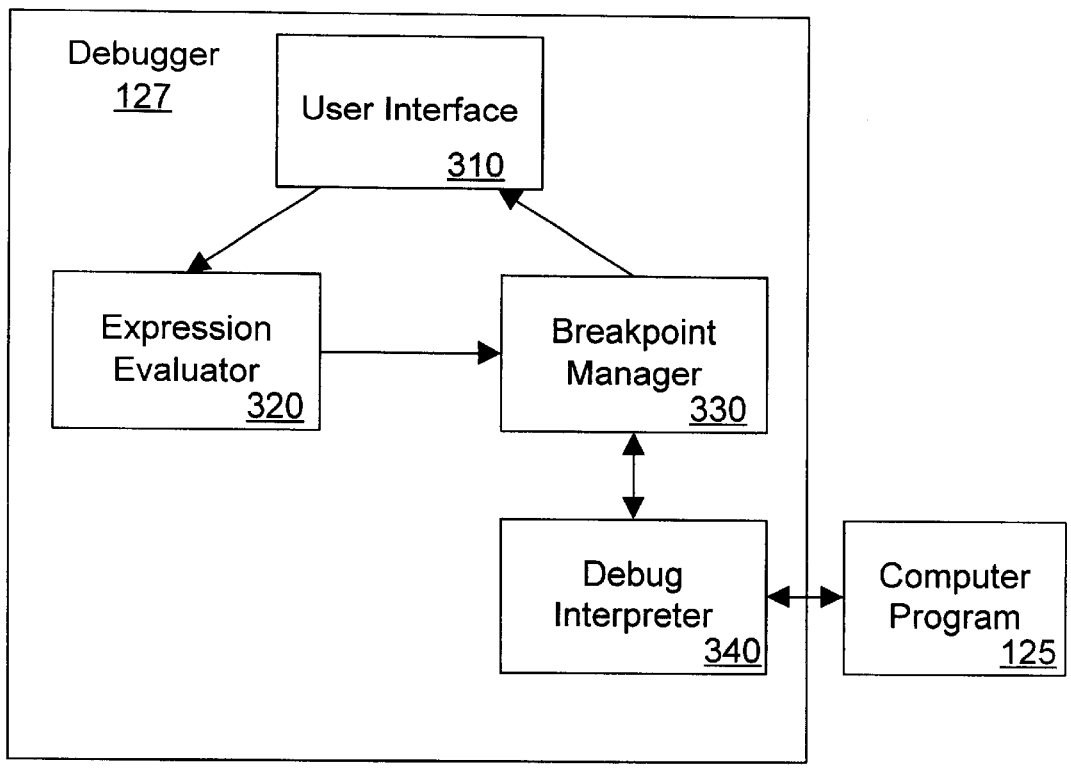
FIG. 3 is a block diagram showing a debugger and a computer program in one specific example implementation according to the preferred embodiments.
FIG. 4 shows Java pseudo-code for a sample computer program that is used to illustrate the concepts of the preferred embodiments.

One particular implementation of a suitable debugger and method in accordance with the preferred embodiments is shown in FIGS. 3–12. Referring to FIG. 3, a suitable debugger 127 includes a user interface 310, an expression evaluator 320, a breakpoint manager 330, and a debug interpreter 340 that interacts with the computer program 125 that is being debugged. Note that many other functions may be included in debugger 127, but are not shown here to simplify the explanation herein.

User interface 310 provides graphical data to a user and receives input from the user. Input received from the user interface 310 is passed to the expression evaluator 320, which evaluates the input to determine what actions are appropriate. Expression evaluator 320 interacts with breakpoint manager 330, which also interacts with user interface 310. Debug interpreter 340 is the mechanism in the debugger 127 that is used to execute computer program 125. Debug interpreter 340 provides a simulation of executing the instructions within computer program 125. The execution of the computer program 125 can trigger certain conditions that are of interest (such as exceptions). When debug interpreter 340 detects a condition of interest, it can pass control to the breakpoint manager 330, which can then interpret what condition occurred and how to handle the condition.

The computer program 125 of FIG. 4 is a sample source code program written in Java pseudo-code that is used to illustrate the concepts of the preferred embodiments. Program 125 defines an Employee class (see 410) that has a doWork( ) method (see 420) and a spendEnergy( ) method (see 440). Note that other methods are also defined in the employee class, but are not shown in FIG. 4.

The doWork( ) method of computer program 125 has an integer variable declaration at 422, and includes four instructions 430, 432, 434, and 436. Instruction 430 performs a calculation on the integer variables x and t. Instruction 432 calls the spendEnergy( ) method, which is defined at 440. Instruction 434 calls a calculateCost( ) method that is not shown in FIG. 4. The result of the calculateCost( ) method invoked in instruction 434 is returned in instruction 436.

The spendEnergy( ) method of computer program 125 has an integer variable declaration at 442, and includes three instructions 450, 452, and 454. Instruction 450 invokes a potentialEnergy( ) method (not shown in FIG. 4). Instruction 452 invokes a kineticEnergy( ) method (not shown in FIG. 4). The result is returned in instruction 454. This small sample computer program 125 in FIG. 4 will now be used to illustrate one specific implementation in accordance with the preferred embodiments.

When debugging computer program 125, a programmer may want to define exceptions that are for debug purposes only, which are handled by a debugger exception handler 129. Note that the term "debugger exception handler" is not a term of art, but is used herein to distinguish between exception handlers defined in the computer program and exception handlers that are defined for debugging purposes (the debugger exception handlers). Let's first assume that a user is debugging computer program 125 in FIG. 4, and decides that he or she would like to determine whether any unexpected exceptions occur during the execution of instructions 430, 432 and 434. The user preferably uses the user interface 310 (FIG. 3) to define region #1, which includes these three instructions. One suitable way for the user to define this region is to point to instruction 430 with a pointing device (such as a mouse), click, and drag the pointer to instruction 434. The user could then invoke a menu function that defines the selected instructions as an exception region in computer program 125. When the user defines this region #1, a debugger exception handler corresponding to that region is automatically created. The user then uses the user interface 310 to define region #2, which is a single instruction 452. One suitable way of defining region #2 is to place the pointer on instruction 452, click, and invoke the menu function to define the selected instruction as an exception region in computer program 125. Once the user defines region #2, a debugger exception handler corresponding to that region is automatically created.

Designating regions #1 and #2 as debugger exception regions results in special processing for the instructions in those regions, equivalent to placing a "try" instruction immediately before each instruction in these regions and a "catch" instruction immediately after each instruction. If instruction 434 generates an unexpected exception, the debugger exception handler corresponding to region #1 is invoked. If instruction 452 generates an unexpected exception, the debugger exception handler corresponding to region #2 is invoked. If instruction 450 generates an unexpected exception, it will flow up to region #1, where the debugger exception handler for region #1 will handle the exception. The user may define setup parameters that determine whether a debugger exception handler will generate a breakpoint and halt execution of the code. Note that any exception that is handled at a level in the computer program that is lower than the level of the instructions in the defined region will not generate a breakpoint and halt program execution. Referring to FIG. 5, a data structure is shown that comprises a list 500 of records 510, 520, . . . , 530 for the debugger exception handlers. Each entry in the list is a record that contains information relating to its debugger exception handler. We assume for the purpose of illustration that handler #1 record 510 contains a specification of the handler for region #1 in FIG. 4, and that handler #2 520 contains a specification of the handler for region #2 in FIG. 4. Of course, other handlers, such as Handler #n record 530, may also be defined as well. In the preferred embodiment, debugger exception handler record list 500 is created and maintained separately from existing mechanisms that keep track of exception handlers defined in computer program 125. However, it is equally within the scope of the preferred embodiments to track debugger exception handlers and exception handlers defined in the computer program in the same list or data structure.

The details of the handler #1 record 510 in FIG. 5 are shown in FIG. 6. In this specific example, the user may specify different types of instruction handlers, the class name, the method name, the start instruction, the stop instruction, and breakpoint trigger information. Note that some of these fields may not have data depending on the type of handler that is defined. In FIG. 6, handler #1 510 defines an instruction range handler, so all of these fields may contain data.

FIG. 7 illustrates one suitable dialog 700 for defining exceptions that cause corresponding exception handlers to be created. First, the user defines the exception type. In this example, three different types are defined, namely: instruction range, class default, and global default. An instruction range exception allows a user to select one or more instructions in the computer program and define these instructions as a region where the debugger would like breakpoints to occur for these instructions if the exceptions are not handled at a lower level in the computer program. A class default exception is an exception that is defined for a particular class. If an unexpected exception occurs while executing instructions in that class, the exception will be handled by the class default exception handler. A global default exception is an exception that is defined for the entire computer program 125. If any unexpected exception occurs while executing computer program 125, and no other class default or instruction range debugger exception handlers are present, the global default exception will be processed by a debugger exception handler that corresponds to the global default exception.

Dialog 700 includes a drop-down list 710 that may be used to select one of the debugger exception types discussed above. Dialog 700 includes a class name field 720 where the user enters the name of the class for instruction range and class default exception types. If the type is a global default, no class name is required in field 720. A method field 730 is where the user enters the name of the method of interest for instruction range exception types. For both class default and global default exception types, no information is needed in the method field 730. The start instruction field 740 and stop instruction field 750 allow a user to define the beginning and end, respectively, of an instruction range for an instruction range exception type. Again, for both class default and global default exception types, no information is needed in the start and stop instruction fields 740 and 750. The breakpoint trigger info in handler 510 of FIG. 6 is divided up into two fields 760 and 770 in the dialog 700 of FIG. 7. In field 760, the user can specify names of debugger exceptions that will cause a breakpoint to occur. In the alternative, the user can enter \*ALL, which means that all of the debugger exceptions that are not specifically listed in field 770 will cause a breakpoint to occur. In addition, the user may also enter \*NONE in field 770, which causes no exceptions to be ignored. Of course, if field 760 has \*ALL and field 770 has \*NONE, all debugger exceptions will generate a breakpoint. Once the user has completed entering information into dialog 700, the user clicks on the OK button 780. Of course, the user can always abort the creation of a debugger exception handler by clicking the Cancel button 790.

Figure 8:
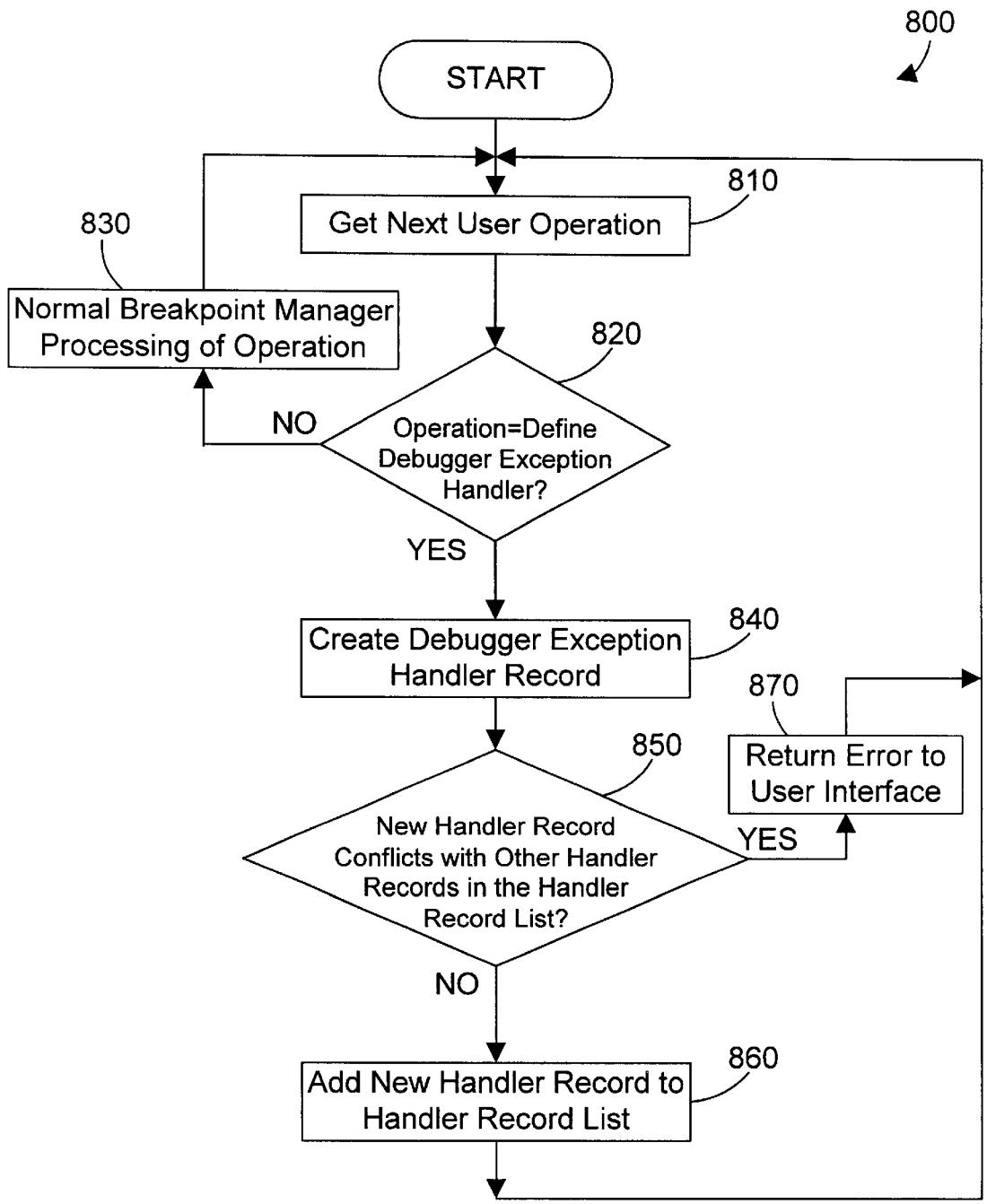
FIG. 8 is a flow diagram of a method performed by the breakpoint manager of FIG. 3 for one specific implementation in accordance with the preferred embodiments.

Referring to FIG. 8, a method 800 shows the steps performed by breakpoint manager 330 (FIG. 3) in defining a debugger exception handler. First, the breakpoint manager gets the next user operation (step 810). Note that the user may perform a large variety of different operations on the breakpoint manager, but the primary one of interest here is the defining and creation of a debugger exception handler. Thus, if the operation is anything other than defining a debugger exception handler (step 820=NO), the breakpoint manager processes the operation as usual (step 830). If the operation is to define a debugger exception handler (step 820=YES), method 800 creates a debugger exception handler record 840, preferably using user interface 310 that displays a dialog similar to 700 in FIG. 7. Once the record is created in step 840, the record must be checked to see if the new handler record conflicts with other existing handler records (step 850). If there is no conflict (step 850=NO), the new handler record is added to the handler record list (step 860). If there is a conflict (step 850=YES), an error is returned to the user interface (step 870) to inform the user that the debugger exception handler record just defined conflicts with another debugger exception handler record.

Figure 9:
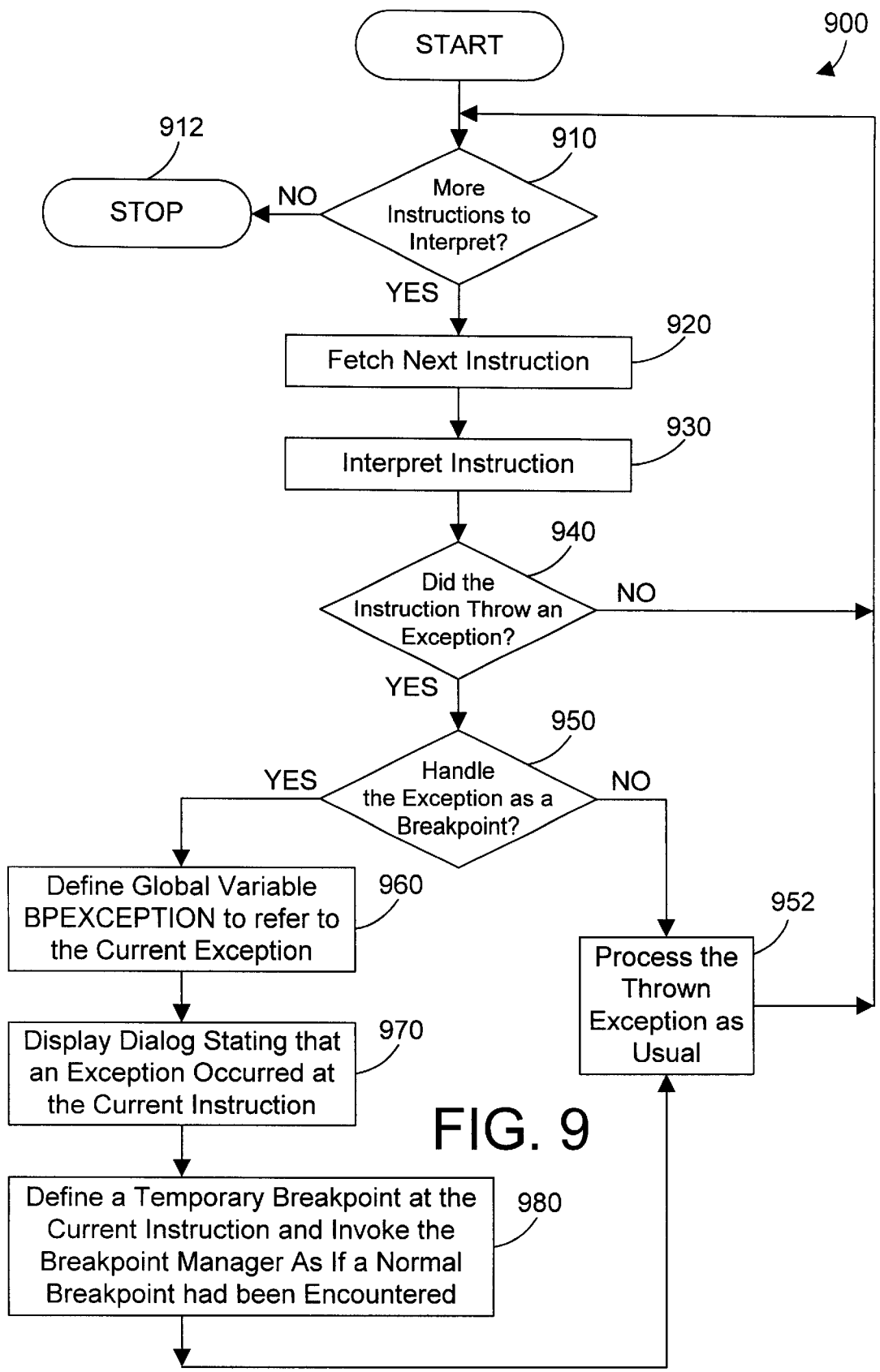
FIG. 9 is a flow diagram of a method performed by the debug interpreter of FIG. 3 for one specific implementation in accordance with the preferred embodiments.
Figure 13:
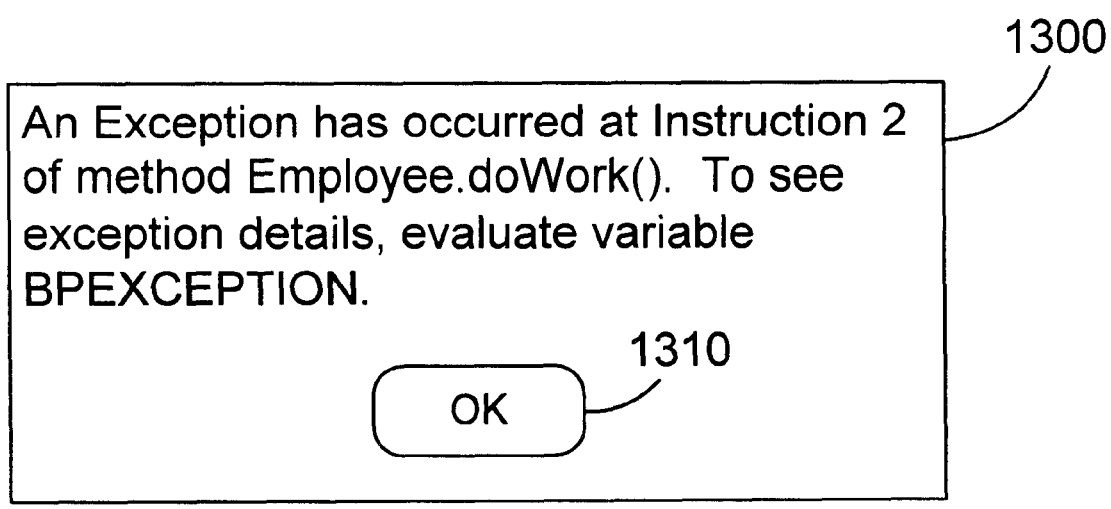
FIG. 13 is a dialog for a graphical user interface that informs a user when a debugger exception has occurred.

The debug interpreter 340 of FIG. 3 preferably implements a method 900 shown in FIG. 9. When there are no more instructions to interpret (step 910=NO), method 900 stops. Until all the instructions in the computer program have been interpreted (step 920=YES), the next instruction is fetched (step 920) and becomes the current instruction. The current instruction is then interpreted (step 930). This instruction interpretation in step 930 is essentially a simulation of the effects of executing the instruction. If the current instruction did not throw an exception (step 950=NO), the debug interpreter loops back to interpret the next instruction (if any). If the current instruction threw an exception (step 940=YES), method 900 now must determine whether to handle the exception as a breakpoint (step 950). Step 950 represents a specific implementation of step 250 of FIG. 2. If the exception is not to be handled as a breakpoint (step 950=NO), method 900 processes the thrown exception as usual (step 952). However, if the current exception is to be handled as a breakpoint (step 950=YES), a global variable BPEXCEPTION is defined to refer to the current exception (step 960). At this point the user is notified that the exception occurred by displaying a dialog to the user (step 970). FIG. 13 shows one suitable implementation 1300 for the dialog in step 970, which informs the user that an exception has occurred, and tells the user how to evaluate the exception (by evaluating BPEXCEPTION). When the user clicks on the OK button 1310, step 970 of FIG. 9 is complete, and the debug interpreter 340 then defines a temporary breakpoint at the current instruction and invokes the breakpoint manager as if a normal breakpoint had been encountered (step 980). This implementation provides the advantage that the breakpoint manager does not know the difference between a breakpoint generated by a debugger exception and any other breakpoint, so the same code used to process normal breakpoints can be used to process breakpoints generated by a debugger exception. This allows the user to inspect the exception and other local variables. Once the user resumes execution of the program, flow continues to step 952 where the exception is processed as usual.

Figure 10:
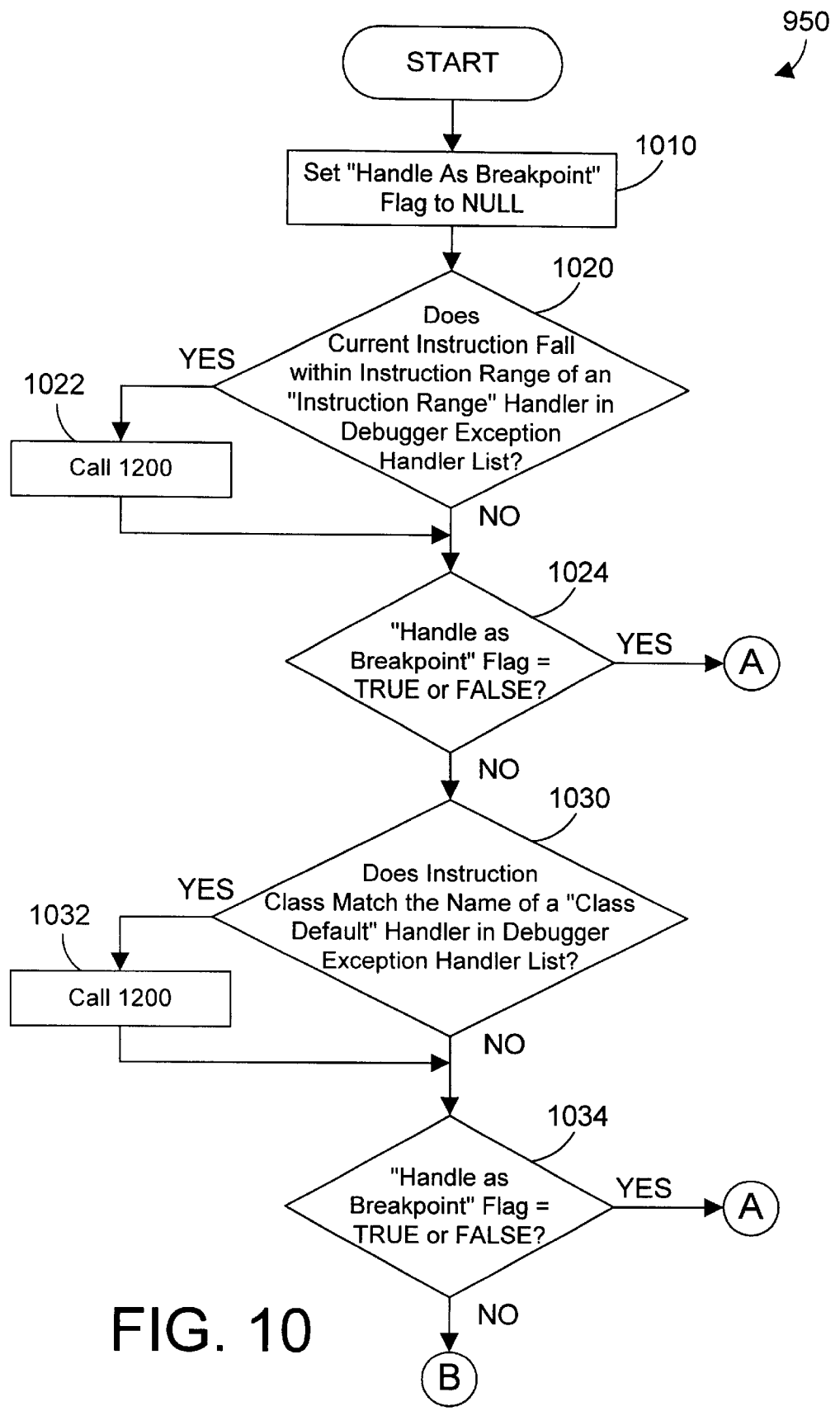
FIGS. 10–12 are flow diagrams for one specific implementation for determining whether to handle an exception as a breakpoint in step 950 of FIG. 9.
Figure 11:
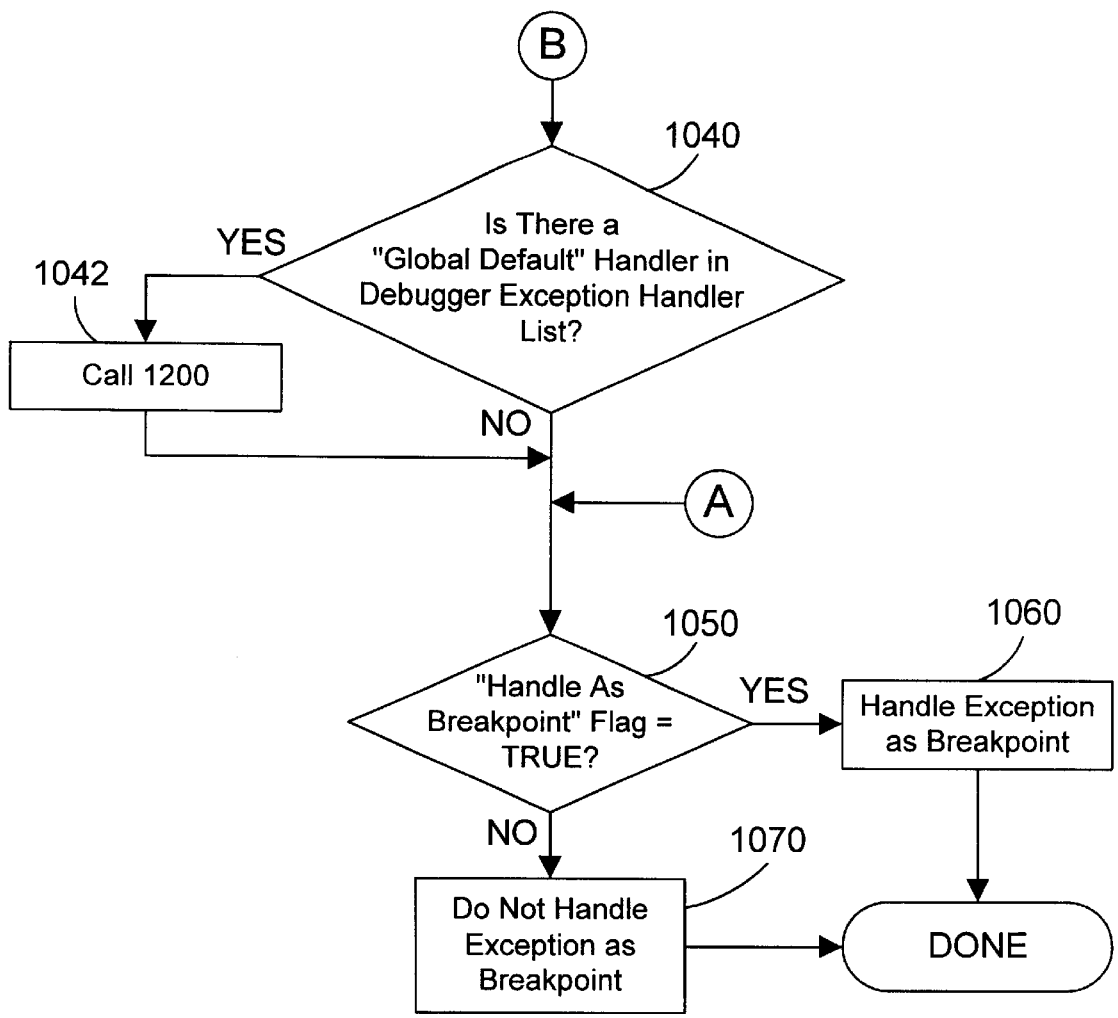
Figure 12:
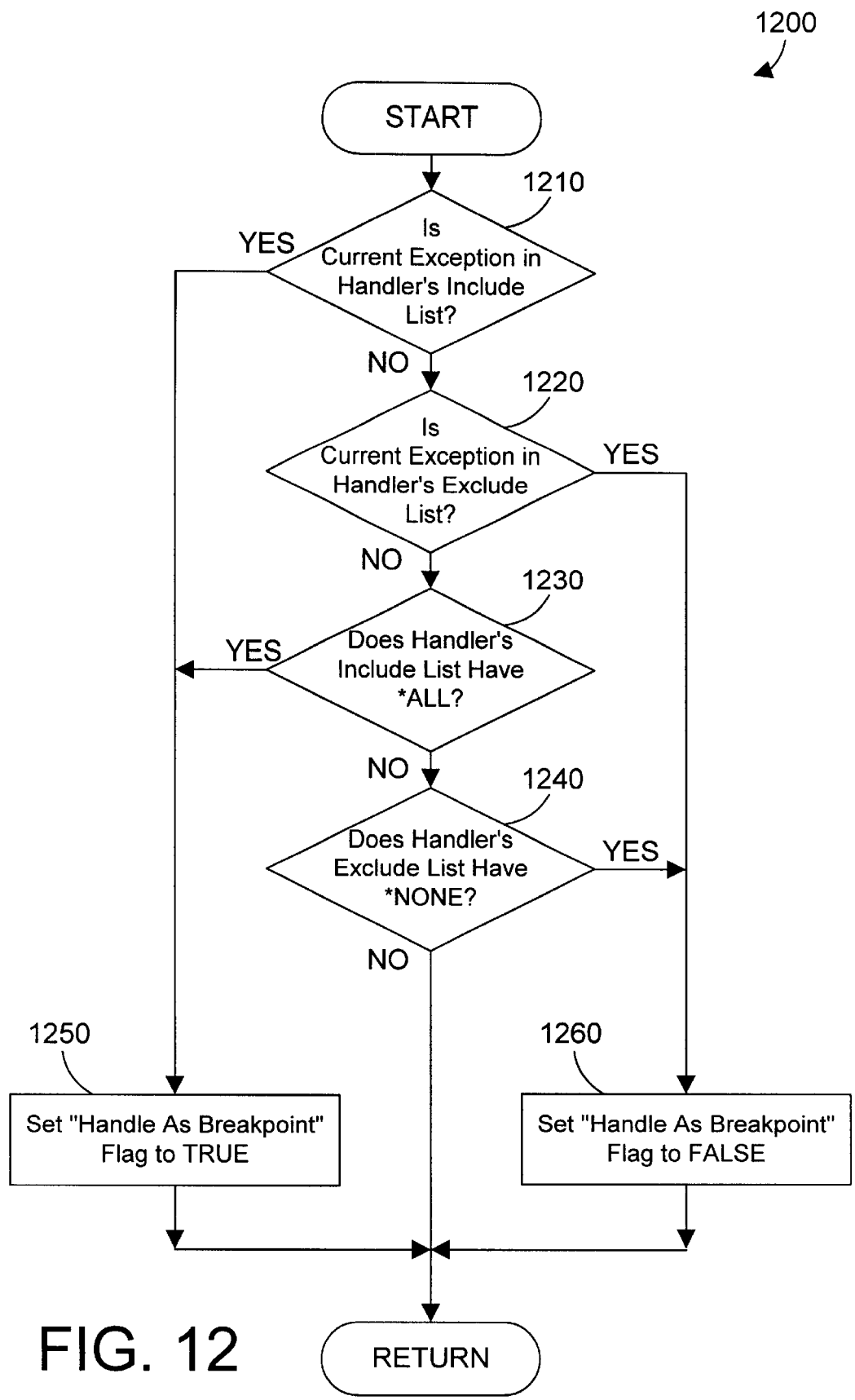

FIGS. 10–12 show steps that are performed by the debug interpreter 340 of FIG. 3 to determine in step 950 of FIG. 9 whether to treat the exception as a breakpoint. First, a flag "Handle as Breakpoint" is set to NULL (step 1010). Next, step 1020 determines whether the current instruction falls within an instruction range of a debugger exception handler of the type "instruction range" in the debugger exception handler list 500. If so (step 1020=YES), method 1200 (see FIG. 12) is called (step 1022). If not (step 1020=NO), or when method 1200 is complete, step 1024 determines whether the "Handle as Breakpoint" flag was set in method 1200. If the "Handle as Breakpoint" flag was set in step 1022 (step 1024=YES), method step 950 goes to point A in FIG. 11, where the flag is tested to see if it is TRUE (step 1050). If the "Handle as Breakpoint" flag is true (step 1050=YES), the exception is handled as a breakpoint (step 1060). If the "Handle as Breakpoint" flag is not true, this means it was set to FALSE in step 1022, which means that the exception is not handled as a breakpoint (step 1070).

If the "Handle as Breakpoint" flag was not set TRUE or FALSE in method 1200 in step 1022 (step 1024=NO), step 1030 then determines whether the class of the current instruction matches the name of a class of a debugger exception handler of the type "class default" in the debugger exception handler list. If so (step 1030=YES), method 1200 is invoked (step 1032). If not (step 1030=NO), or when method 1200 is complete, step 1034 determines whether the "Handle as Breakpoint" flag was set in method 1200. If the "Handle as Breakpoint" flag was set in step 1032 (step 1034=YES), method step 950 goes to point A in FIG. 1, where the flag is tested to see if it is TRUE (step 1050). If the "Handle as Breakpoint" flag is true (step 1050=YES), the exception is handled as a breakpoint (step 1060). If the "Handle as Breakpoint" flag is not true, this means it was set to FALSE in step 1032, which means that the exception is not handled as a breakpoint (step 1070).

If the "Handle as Breakpoint" flag was not set TRUE or FALSE in method 1200 in step 1032 (step 1034=NO), method 950 proceeds to point B in FIG. 11. Step 1040 then determines whether there is a debugger exception handler of the type "global default" in the debugger exception handler list. If so (step 1040=YES), method 1200 is invoked (step 1042). If not (step 1040=NO), or when method 1200 in step 1042 is complete, step 1050 determines whether the "Handle as Breakpoint" flag is TRUE (step 1050). Note that the "Handle as Breakpoint" flag is only true if one of the calls to method 1200 (i.e., step 1022, 1032, or 1042) sets this flag true. If the "Handle as Breakpoint" flag is not true (step 1050=NO), the current exception is not handled as a breakpoint (step 1070), and step 950 is done. If the "Handle as Breakpoint" flag is true (step 1050=YES), the exception is handled as a breakpoint (step 1060). This means that step 950=YES in method 900 of FIG. 9, so the debug interpreter 340 can then perform the remaining steps 960, 970, 980, and 952.

Referring to FIG. 12, method 1200 determines whether or not to set the "Handle as Breakpoint" flag to TRUE or FALSE depending on what information the user entered in fields 760 and 770 of FIG. 7. For the sake of convenience, we refer to field 760 as the "include list" and field 770 as the "exclude list" in the steps of method 1200. If the current exception is in the include list (step 1210=YES), the "Handle as Breakpoint" flag is set to TRUE (step 1250). If the current exception is not specifically included in the include list (step 1210=NO), method 1200 then determines whether the current exception is in the exclude list (step 1220), and if so (step 1220=YES), the "Handle as Breakpoint" flag is set to FALSE (step 1260).

If the current exception is not in the handler's exclude list (step 1220=NO), method 1200 then checks to see if the include list has the *ALL operator (step 1230). As stated above, the *ALL operator will include all exceptions not specifically excluded in the exclude list. If the include list has the *ALL operator (step 1230=YES), the "Handle as Breakpoint" flag is set to TRUE (step 1250). If not (step 1230=NO), method 1200 then determines whether the exclude list has *NONE. If so (step 1240=YES), the "Handle as Breakpoint" flag is set to FALSE (step 1260). If not (step 1240=NO), the flag remains unchanged from its NULL state. With the specific values show in fields 760 and 770 of FIG. 7, method 1200 would set the "Handle as Breakpoint" flag to TRUE for all debugger exceptions except for the two debugger exceptions called IO Error and SocketException, which would set the "Handle as Breakpoint" flag to FALSE.

The preferred embodiments herein provide a way for a user to dynamically define debugger exceptions and create their corresponding handlers. The debugger can be configured to generate breakpoints on debugger exceptions but not on other exceptions that are handled at a lower level in the computer program. In this manner, a programmer can define exceptions within the debugger that will generate breakpoints without the program halting on each normal exception in the program.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a computer program residing in the memory;
   a mechanism residing in the memory and executed by the at least one processor, the mechanism dynamically defining at least one debugger exception handler for the computer program; and
   a debugger residing in the memory and executed by the at least one processor, the debugger creating a breakpoint when an exception corresponding to the at least one debugger exception handler is generated and not creating a breakpoint for any exception not corresponding to the at least one debugger exception handler.

2. The apparatus of claim 1 wherein the mechanism that dynamically defines the at least one debugger exception handler comprises a graphical user interface that allows a user to define a new debugger exception handler.

3. The apparatus of claim 2 wherein the graphical user interface allows the user to select a range of instructions in the computer program, wherein the new debugger exception handler handles an exception that occurs in the selected range of instructions that is not handled at a lower level in normal processing of the computer program.

4. The apparatus of claim 3 wherein the selection of the range by a user using the graphical user interface initiates creation of the new debugger exception handler.

5. The apparatus of claim 2 wherein the graphical user interface allows the user to define a class default exception handler for a selected class in the computer program, wherein the class default exception handler handles an exception that occurs when executing an instance of the selected class that is not handled at an appropriate level in normal processing of the computer program.

6. The apparatus of claim 2 wherein the graphical user interface allows the user to define a global default exception handler for the computer program, wherein the global default exception handler handles an exception that occurs when executing the computer program that is not handled at a lower level in normal processing of the computer program.

7. An apparatus comprising:
   (1) a computer program residing in a memory;
   (2) means for defining at least one debugger exception handler in the computer program for debugging the computer program;
   (3) means for executing the computer program until an exception occurs;
   (4) means for determining when an occurred exception is handled by one of the at least one debugger exception handlers defined by (2);
   (5) means for generating a breakpoint to halt the execution of the computer program if the occurred exception is handled by one of the at least one debugger exception handlers defined by (2), and
   (6) means for continuing execution of the computer program without generating a breakpoint for the occurred exception if the occurred exception is not handled at a lower level by one of the at least one debugger exception handlers defined by (2).

8. A method for debugging a computer program comprising the steps of:

(1) defining at least one debugger exception handler in the computer program;

(2) executing the computer program until an exception occurs;

(3) if the exception that occurred in step (2) is handled by one of the at least one debugger exception handlers defined in step (1), generating a breakpoint to halt the execution of the computer program;

(4) if the exception that occurred in step (2) is not handled at a lower level by one of the at least one debugger exception handlers defined in step (1), continuing execution of the computer program without generating a breakpoint for the exception that occurred in step (2).

9. The method of claim 8 wherein step (1) includes the step of a user defining a new debugger exception handler using a graphical user interface.

10. The method of claim 9 wherein step (1) includes the step of the user using the graphical user interface to select a range of instructions in the computer program, wherein the new debugger exception handler handles an exception that occurs in the selected range of instructions that is not handled at a lower level in normal processing of the computer program.

11. The method of claim 10 wherein the selection of the range by a user using the graphical user interface initiates creation of the new debugger exception handler.

12. The method of claim 9 wherein step (1) includes the step of a user using the graphical user interface to define a class default exception handler for a selected class in the computer program, wherein the class default exception handler handles an exception that occurs when executing an instance of the selected class that is not handled at a lower level in normal processing of the computer program.

13. The method of claim 9 wherein step (1) includes the step of a user using the graphical user interface to define a global default exception handler for the computer program, wherein the global default exception handler handles an exception that occurs when executing the computer program that is not handled at a lower level in normal processing of the computer program.

14. A program product comprising:

a debugger mechanism that generates at least one debugger exception handler for a computer program and that creates a breakpoint when an exception corresponding to the at least one debugger exception handler is generated and that does not create a breakpoint for any exception not corresponding to the at least one debugger exception handler; and signal bearing media bearing the debugger mechanism.

15. The program product of claim 14 wherein the signal bearing media comprises recordable media.

16. The program product of claim 14 wherein the signal bearing media comprises transmission media.

17. The program product of claim 14 wherein the debugger mechanism comprises a graphical user interface that allows a user to define a new debugger exception handler.

18. The program product of claim 17 wherein the graphical user interface allows the user to select a range of instructions in the computer program, wherein the new debugger exception handler handles an exception that occurs in the selected range of instructions that is not handled at a lower level in normal processing of the computer program.

19. The program product of claim 17 wherein the graphical user interface allows the user to define a class default exception handler for a s elected class in the computer program, wherein the class default exception handler handles an exception that occurs when executing an instance of the selected class that is not handled at a lower level in normal processing of the computer program.

20. The program product of claim 17 wherein the graphical user interface allows the user to define a global default exception handler for the computer program, wherein the global default exception handler handles an exception that occurs when executing the computer program that is not handled at a lower level in normal processing of the computer program.

* * * * *